(12) United States Patent
Diez Garcia et al.

(10) Patent No.: US 11,067,463 B2
(45) Date of Patent: Jul. 20, 2021

(54) PRESSURE METER FOR FLUID CIRCUITS

(71) Applicant: CEBI ELECTROMECHANICAL COMPONENTS SPAIN, S.A., Villatuerta (ES)

(72) Inventors: Sergio Diez Garcia, Villatuerta (ES); Ignacio Ardaiz Usoz, Villatuerta (ES); Lesmes Nicolas Haro, Villatuerta (ES)

(73) Assignee: CEBI ELECTROMECHANICAL COMPONENTS SPAIN, S.A., Villatuerta (ES)

( * ) Notice: Subject to any disclaimer, the term of this patent is extended or adjusted under 35 U.S.C. 154(b) by 108 days.

(21) Appl. No.: 16/522,328

(22) Filed: Jul. 25, 2019

(65) Prior Publication Data
US 2020/0033215 A1    Jan. 30, 2020

(30) Foreign Application Priority Data
Jul. 26, 2018  (ES) .............................. ES201831186U

(51) Int. Cl.
G01L 19/00        (2006.01)

(52) U.S. Cl.
CPC ................................ G01L 19/0084 (2013.01)

(58) Field of Classification Search
CPC ............. G01L 19/0084; G01L 19/0618; G01L 19/147; G01L 19/148
See application file for complete search history.

(56) References Cited

U.S. PATENT DOCUMENTS

| | | | | |
|---|---|---|---|---|
| 4,875,135 A | * | 10/1989 | Bishop | G01L 9/0075 361/283.4 |
| 5,827,972 A | * | 10/1998 | Balcarek | G01L 9/0072 73/756 |
| 5,867,886 A | * | 2/1999 | Ratell | G01L 9/0055 29/595 |
| 6,055,864 A | * | 5/2000 | Stiller | G01L 19/0084 73/718 |
| 6,209,399 B1 | * | 4/2001 | Probst | G01L 19/0084 73/756 |
| 6,374,679 B1 | * | 4/2002 | Babala | B60T 8/3675 73/715 |
| 6,487,911 B1 | * | 12/2002 | Frackelton | G01L 9/0075 73/714 |
| 6,506,069 B2 | * | 1/2003 | Babala | G01L 19/003 439/248 |
| 6,584,851 B2 | * | 7/2003 | Yamagishi | G01L 19/0084 73/715 |
| 6,591,684 B2 | * | 7/2003 | Babala | B60T 8/3675 73/706 |
| 6,843,537 B2 | * | 1/2005 | Babala | G01L 15/00 303/122.09 |
| 7,107,856 B2 | * | 9/2006 | Kopp | G01L 19/003 73/756 |

(Continued)

*Primary Examiner* — David J Bolduc
(74) *Attorney, Agent, or Firm* — Lucas & Mercanti, LLP

(57) ABSTRACT

The invention relates to a pressure meter for fluid circuits which has a pressure-sensitive cell that is arranged connected to an electronic circuit, connected to which, in turn, are terminals of a connector for connecting the meter in the application thereof, wherein the pressure-sensitive cell is housed in a metal body, wherein it rests by means of a seal, while a plastic disc is arranged resting against the surface of the upper face of the pressure-sensitive cell, whereon an electronic circuit is incorporated.

9 Claims, 5 Drawing Sheets

(56) References Cited

U.S. PATENT DOCUMENTS

| | | | |
|---|---|---|---|
| 7,240,557 B2* | 7/2007 | Muller | B29C 63/0065 73/706 |
| 7,383,737 B1* | 6/2008 | Lin | G01L 9/0072 73/718 |
| 8,156,816 B2* | 4/2012 | Willner | G01L 19/0084 73/720 |
| 9,581,468 B2* | 2/2017 | Nguyen | G01L 5/165 |
| 9,739,676 B2* | 8/2017 | Hio | G01L 19/14 |
| 2003/0151126 A1* | 8/2003 | Scheurich | G01L 19/143 257/682 |
| 2004/0200286 A1* | 10/2004 | Mast | G01L 19/143 73/715 |
| 2005/0056097 A1* | 3/2005 | Banholzer | G01L 19/0038 73/700 |
| 2005/0087020 A1* | 4/2005 | Ueyanagi | G01L 19/143 73/753 |
| 2006/0213276 A1* | 9/2006 | Ueyanagi | G01L 19/0627 73/754 |
| 2007/0113659 A1* | 5/2007 | Mueller | G01L 19/147 73/714 |
| 2009/0158853 A1* | 6/2009 | Berner | G01L 19/147 73/724 |
| 2009/0211363 A1* | 8/2009 | Drewes | G01L 19/147 73/723 |
| 2010/0192696 A1* | 8/2010 | Schlitzkus | G01L 19/148 73/756 |
| 2013/0192361 A1* | 8/2013 | Herderich | G01L 19/0084 73/431 |
| 2014/0022717 A1* | 1/2014 | Bolik | G01D 11/24 361/679.01 |
| 2016/0370245 A1* | 12/2016 | Haldorsen | G01L 19/0618 |
| 2017/0010170 A1* | 1/2017 | Schlitzkus | G01L 19/0061 |
| 2018/0313712 A1* | 11/2018 | Morsch | G01L 19/0618 |

* cited by examiner

PRESSURE METER FOR FLUID CIRCUITS

CROSS-REFERENCE TO RELATED APPLICATION

This application claims the benefit of priority from Spanish Patent Application No. U201831186, filed Jul. 26, 2018, which is incorporated herein by reference.

TECHNICAL FIELD

The present invention is related to controlling the pressure in circuits of fuel, refrigerants, thermal fluids, etc., in the automotive sector, industrial sector or other sectors, proposing a pressure meter with an embodiment that offers advantageous functional and productive features.

BACKGROUND OF THE INVENTION

In the industrial, automotive, and other sectors it is necessary to control the pressure of fluid circuits with different functional natures, with sensor devices that effectively enable the development of said function.

Up until now, this function has been carried out by means of the development of different embodiments of devices, with pressure meter devices currently existing that comply to a greater or lesser degree with the requirements for said application.

To this respect, pressure meter devices are known which use a ceramic capacitive sensor for measuring the pressure in circuits through which fluids circulate.

In one embodiment of existing devices of this type, such as U.S. Pat. No. 6,487,911 B1, a pressure-sensitive cell is arranged on a plastic body, the cell resting against said plastic body by means of a seal that is compressed between both of them, while a connector is arranged on the pressure-sensitive cell for connecting the meter device in the system of application for which it is intended, said connector resting against a pressure-sensitive cell in certain areas, specifically at the corners of the cell, which support the stresses exerted on the same by the action of the fluid to be controlled in the application of the meter device and the counter pressure of the assembly.

A flexible electronic circuit is further arranged joined to the pressure-sensitive cell, to which, in turn, the connector for connecting the meter device is connected, with branches coming out of the flexible electronic circuit, with which a connection with an outer metal body is established, which houses the functional assembly and shields the same, said metal body having a threaded neck for assembling the meter device in the system of application.

In the known devices, the measuring of the pressure is performed by means of the pressure-sensitive cell, configured based on a ceramic structure, able to be the principle of conversion of the pressure into any electrical signal (the one for variable capacity, for variable resistance, etc.), the cell also being connected to the electronic circuit of the meter device and positioned on the plastic body which houses the temperature-sensitive element.

With said arrangement, due to the fact that the connector rests against the pressure-sensitive cell only on specific areas (the corners of the cell), it is necessary for the ceramic structure thereof to have a considerable thickness in order to provide the necessary rigidity to withstand the stresses acting in the measuring of the pressure, which increases the cost of the pressure-sensitive cell.

On the other hand, the connection of the flexible electronic circuit to the metal body which houses and shields the functional assembly makes the assembly of the meter device difficult and increases the difficulty of automating the process.

In light of all of these drawbacks and limitations of known solutions of pressure meter devices, it is therefore necessary to develop a solution that simplifies and facilitates the production process and optimises the functional behavior of said devices.

SUMMARY OF THE INVENTION

According to the invention, a pressure meter device is proposed to control fluids in circuits, with features that advantageously solve the drawbacks and limitations of currently existing meter devices of this type.

This device object of the invention incorporates a pressure-sensitive cell, configured around a ceramic structure that uses any principle of conversion to convert pressure into an electrical signal, among which, for example, are those for variable capacity and variable resistance.

Said pressure-sensitive cell is arranged inside a metal body, against which the pressure-sensitive cell rests by means of a seal, while a plastic disc is arranged on the cell, which has a cavity wherein said cell fits resting at least against the projection on the upper face of the contact surface between the pressure-sensitive cell and the medium the pressure of which is to be measured.

An electronic circuit is arranged on the plastic disc, to which the terminals of a connector are connected, with which the metal body is closed with an axial pressure that makes the support seal of the pressure-sensitive cell on the metal body stay compressed.

As such, thanks to the specified resting contact of the plastic disc against the pressure-sensitive cell, a good rigidity of the assembly of the pressure-sensitive cell is achieved, allowing the compression of the support seal to be precisely controlled, thereby improving the functional behavior of said pressure-sensitive cell, and thus the ceramic structure component of said cell can have a lesser thickness, reducing the cost of the pressure-sensitive cell.

The electronic circuit is further established connected by means of a spring to the metal body that houses the functional assembly of the meter device, with which the metal body also acts as a protective shield for the functional assembly of the meter device.

On the other hand, the arrangement of the electronic circuit in the constructive assembly of the meter device does not require a precise fit or positioning, which simplifies the constructive assembly with respect to conventional meter devices provided with a flexible electronic circuit with branches in the arrangement of the assembly, also facilitating the automation of the constructive assembly process of the meter device.

Due to all of the previously explained points, the meter device object of the invention results in constructive and functional features which make it advantageous for measuring the pressure in fluid circuits, taking on a life of its own and preferred character with respect to conventional devices with the same application.

DETAILED DESCRIPTION OF THE INVENTION

Figure 1:
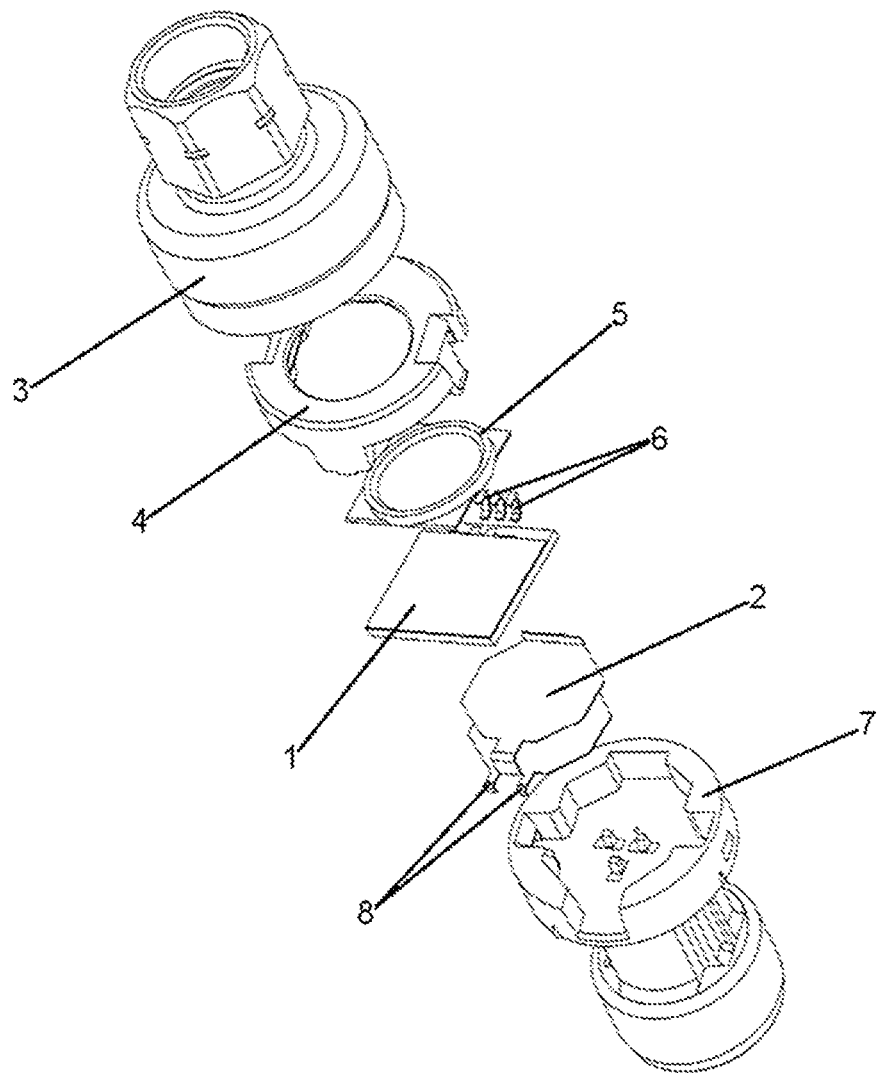
FIG. 1 shows an exploded perspective view of the assembly of a pressure-meter device according to a conventional embodiment of the state of the art.

The object of the invention relates to a pressure-meter device for controlling fluids in circuits for any application, incorporating, according to a conventional solution like the one shown in FIG. 1, a pressure-sensitive cell (1), which is a ceramic capacitive cell, said pressure-sensitive cell (1) arranged connected to a flexible electronic circuit (2), to which, in turn, a connector (3) for connecting the meter device is connected in the system of application for which it is used.

In this conventional embodiment, the pressure-sensitive cell (1) is arranged housed in a plastic body (4), resting against a seal (5) and secured to the flexible electronic circuit (2) by means of clips (6), thereby forming a functional assembly that is housed between a metal body (7) and the connector (3), wherein the flexible electronic circuit (2) connects to the metal body (7) by means of branches (8) of said flexible electronic circuit (2), so that the aforementioned metal body (7) acts as a protective shield for the functional assembly.

According to the invention, the pressure-sensitive cell (1) is arranged on the inside of a metal body (9) which has a threaded neck (10) for assembling the meter device in the system of application for which it is intended, the pressure-sensitive cell (1) resting against that metal body (9), by means of a seal (11), while a plastic disc (12) is arranged on the pressure-sensitive cell (1), which has a cavity (12.1) wherein the pressure-sensitive cell (1) fits, an electronic circuit (13) being arranged on said plastic disc (12), to which the terminals (14) of a connector (15) are connected, intended to connect the meter device in the system of application.

The cavity (12.1) of the plastic disc (12) rests against the pressure-sensitive cell (1) at least on the projection on the upper face of the contact surface between the pressure-sensitive cell a) and the fluid of which the pressure is to be known; such that the support surface is much larger than in conventional devices, which allows the ceramic structure of the pressure-sensitive cell (1) to be thinner, thus resulting in a lower price.

Figure 2:
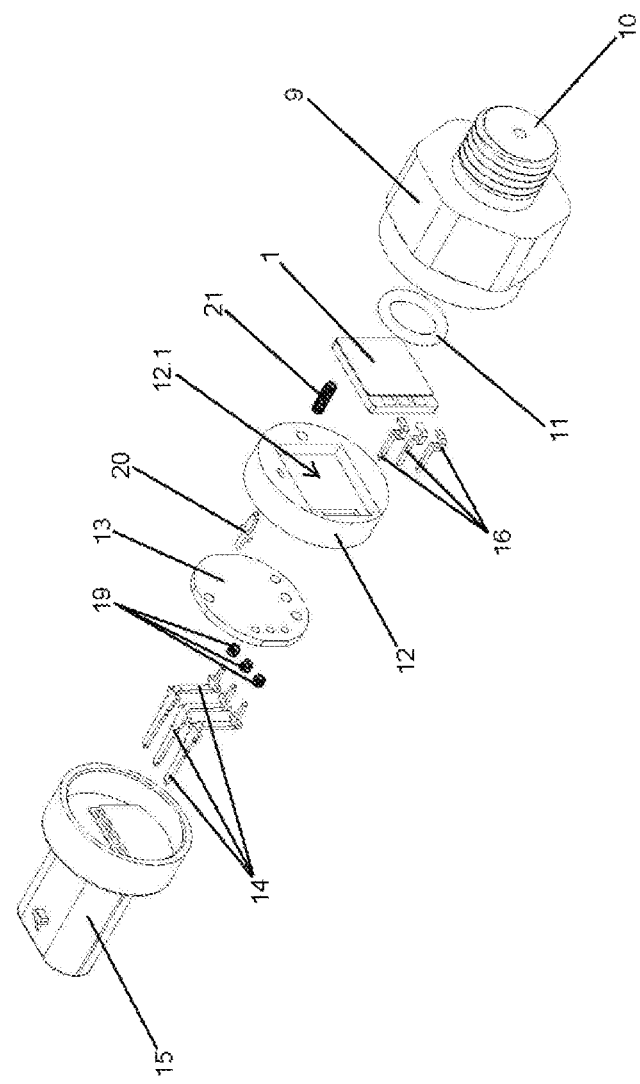
FIG. 2 shows an exploded perspective view of an embodiment of a pressure-meter device according to the object of the invention.
Figure 3:
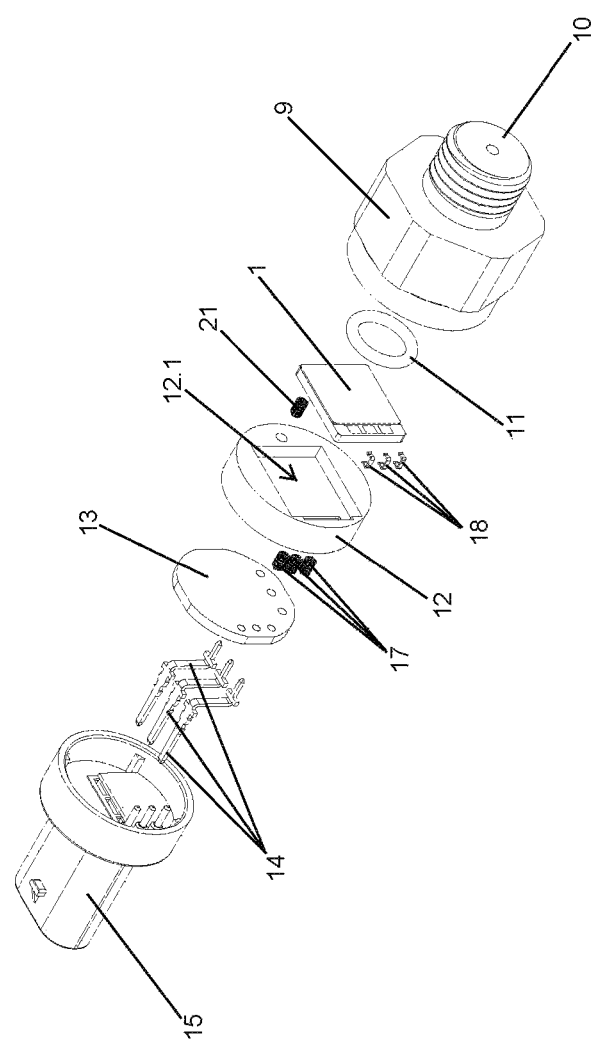
FIG. 3 shows an exploded perspective view of another embodiment of a pressure-meter device according to the invention.
Figure 4:
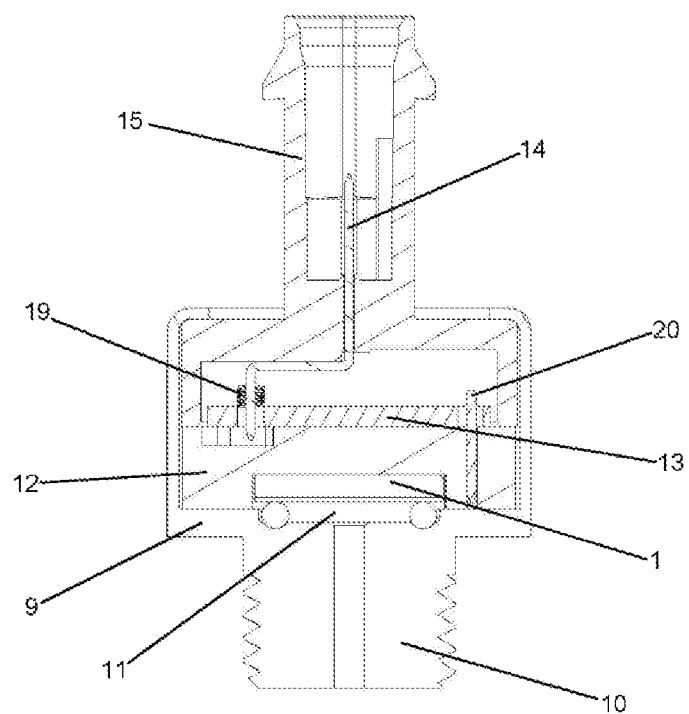
FIG. 4 is a diametral cross-sectional view of the mounted assembly of the meter device of FIG. 2.
Figure 5:
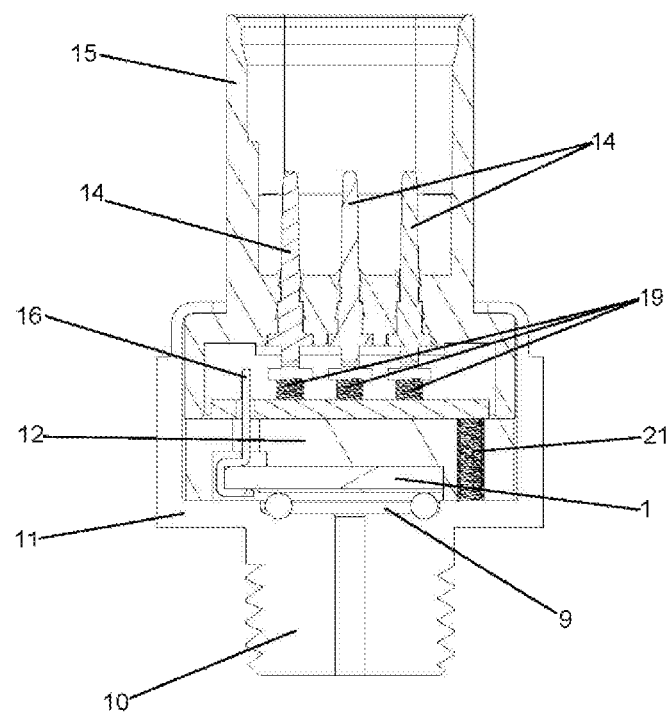
FIG. 5 is a diametral cross-sectional view of the mounted assembly of the meter device of FIG. 2 along a cutting plane perpendicular to that of the preceding figure.

The electronic circuit (13) can be connected to the pressure-sensitive cell (1) by means of rigid terminals (16), according to the embodiment of FIG. 2, or by means of springs (17) that rest against clips (18) soldered to the pressure-sensitive cell (1), according to the embodiment of FIG. 3.

Furthermore, the electronic circuit (13) can connect to the terminals (14) of the connector (15) by means of springs (19) and be secured to the plastic disc (12) by means of a fastening terminal (20), as in the embodiment of FIG. 2, or be directly joined to the terminals (14) of the connector (15) by soldering, as in the embodiment of FIG. 3.

The functional assembly, according to any one of the mentioned assembly embodiments, is arranged housed between the metal body (9) and the connector (15), which are closed with respect to one another, with an axial assembly pressure that compresses the seal (11) in order to establish the necessary seal to prevent the fluid being controlled in the application of the meter device from reaching the location of the electronic circuit (13).

In the arrangement of the assembly of the meter device, the electronic circuit (13) is further established connected to the metal body (9) by means of at least one spring (21), thereby achieving that the very metal body (9) acts as a protective shield for the functional assembly.

The pressure-sensitive cell (1) is configured around a ceramic structure that can use different principles of conversion for converting the pressure into an electrical signal, among which are those for variable capacity and variable resistance.

The invention claimed is:

1. A pressure meter for fluid circuits comprising:
a metal body on one end of the pressure meter and a connector on an opposite end of the pressure meter, the connector comprising terminals;
a pressure-sensitive cell housed in the metal body, the pressure-sensitive cell resting against the metal body by means of a seal;
a plastic disc comprising a first surface and a second surface, the first surface fit for the pressure sensitive cell, wherein the plastic disc rests against a surface of an upper face of the pressure-sensitive cell;
an electronic circuit incorporated on the second surface of the plastic disc,
wherein the terminals of the connector are connected to the electronic circuit.

2. The pressure meter for fluid circuits, according to claim 1, wherein the electronic circuit is joined to the pressure-sensitive cell by means of rigid terminals.

3. The pressure meter for fluid circuits, according to claim 1, wherein the electronic circuit is secured onto the plastic disc by means of a fastening terminal.

4. The pressure meter for fluid circuits, according to claim 1, wherein the terminals of the connector connect to the electronic circuit by means of springs.

5. The pressure meter for fluid circuits, according to claim 1, wherein the electronic circuit is joined to the pressure-sensitive cell by means of springs that make contact with clips soldered to the pressure-sensitive cell.

6. The pressure meter for fluid circuits, according to claim 1, wherein the terminals of the connector connect to the electronic circuit in a direct connection by means of a soldered joint.

7. The pressure meter for fluid circuits, according to claim 5, wherein the electronic circuit connects to the metal body by means of a spring.

8. The pressure meter for fluid circuits, according to claim 1, wherein the metal body is closed with the connector, establishing an axial pressure that compresses the seal of the pressure-sensitive cell on the metal body.

9. The pressure meter for fluid circuits, according to claim 1, wherein the plastic disc comprises a cavity wherein the pressure-sensitive cell fits.

* * * * *